No. 882,715.  
PATENTED MAR. 24, 1908.  
G. V. RATZ.  
HARVESTER REEL AND ACTUATING MECHANISM THEREFOR.  
APPLICATION FILED MAY 28, 1907.  
3 SHEETS—SHEET 1.

Attest:  
F. E. Alexander  
J. Alexander Vernon

George V. Ratz, Inventor:  
by his Att'ys,  
Henry T. Gough

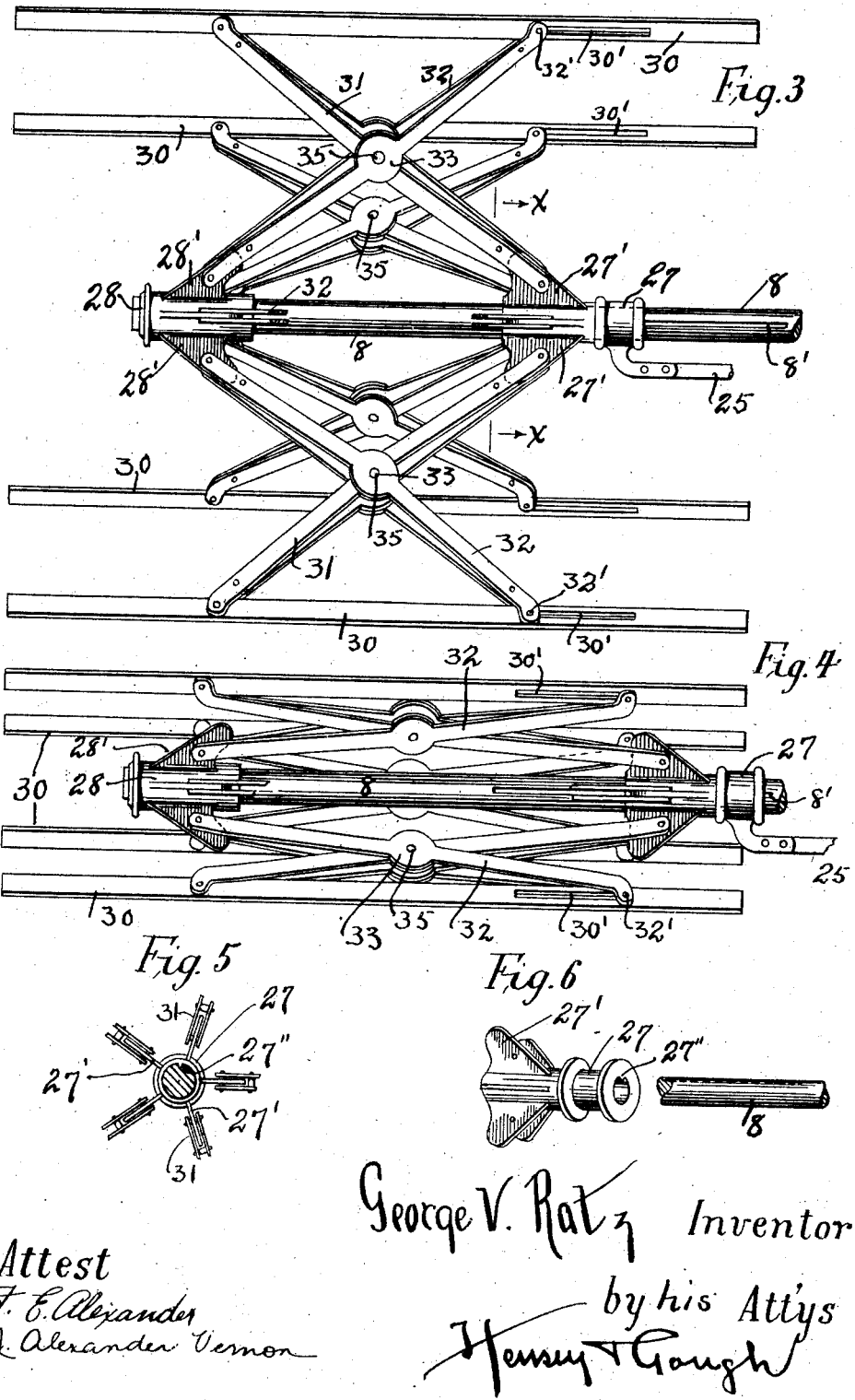

No. 882,715. PATENTED MAR. 24, 1908.
G. V. RATZ.
HARVESTER REEL AND ACTUATING MECHANISM THEREFOR.
APPLICATION FILED MAY 28, 1907.
3 SHEETS—SHEET 3.
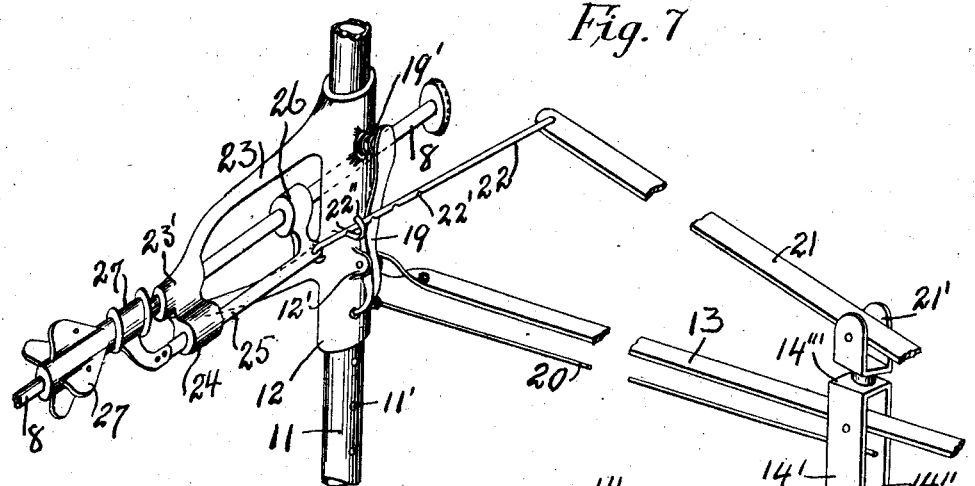
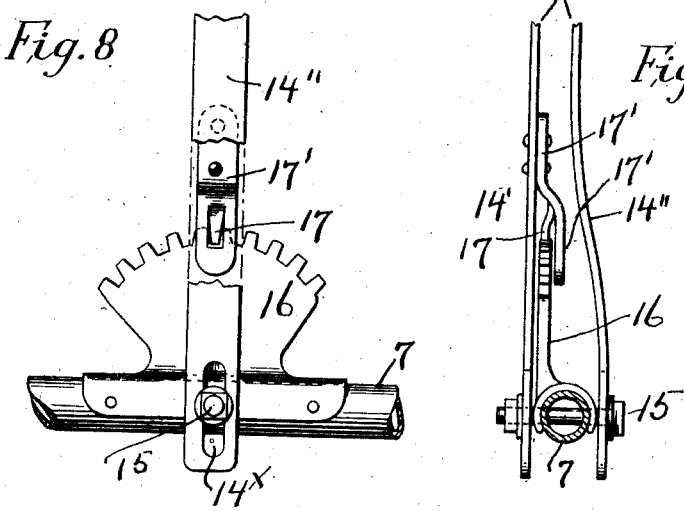
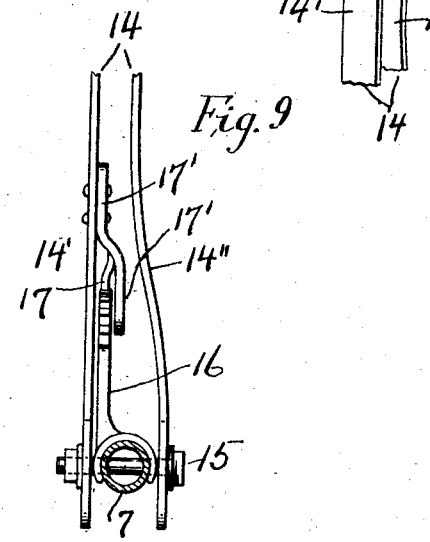
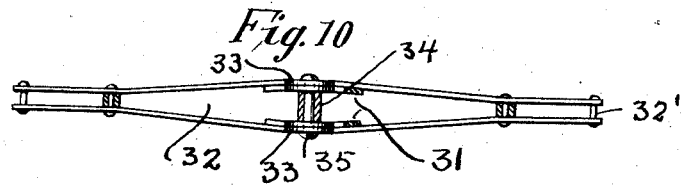
Attest
F. E. Alexander
J. Alexander Vernon
George V. Ratz, Inventor:
by his Atty's,
Henry Gough

UNITED STATES PATENT OFFICE.

GEORGE V. RATZ, OF PEKIN, INDIANA.

HARVESTER-REEL AND ACTUATING MECHANISM THEREFOR.

No. 882,715.   Specification of Letters Patent.   Patented March 24, 1908.

Application filed May 28, 1907. Serial No. 376,115.

*To all whom it may concern:*

Be it known that I, GEORGE V. RATZ, a citizen of the United States, residing at Pekin, in the county of Washington, State of Indiana, have invented certain new and useful Improvements in Harvester-Reels and Actuating Mechanism Therefor, of which the following is a specification.

My invention relates to reels or beaters used on reaping machinery, and more particularly to reels so constructed that they will fold up into small compass, and to mechanism for folding or collapsing the reel and for adjusting it to a variety of positions in relation to the apparatus.

The object of the invention is to provide a reel of extreme lightness and strength which may be collapsed and in which the reel blades or arms will be parallel to each other and to the axis of rotation at every position which the reel may take and in every stage of expansion. In addition its further object is to provide means independently operable whereby the reel may be opened or closed, lifted or depressed.

The invention consists in the construction and arrangement of parts set forth more definitely in the claims appended.

Figure 1:
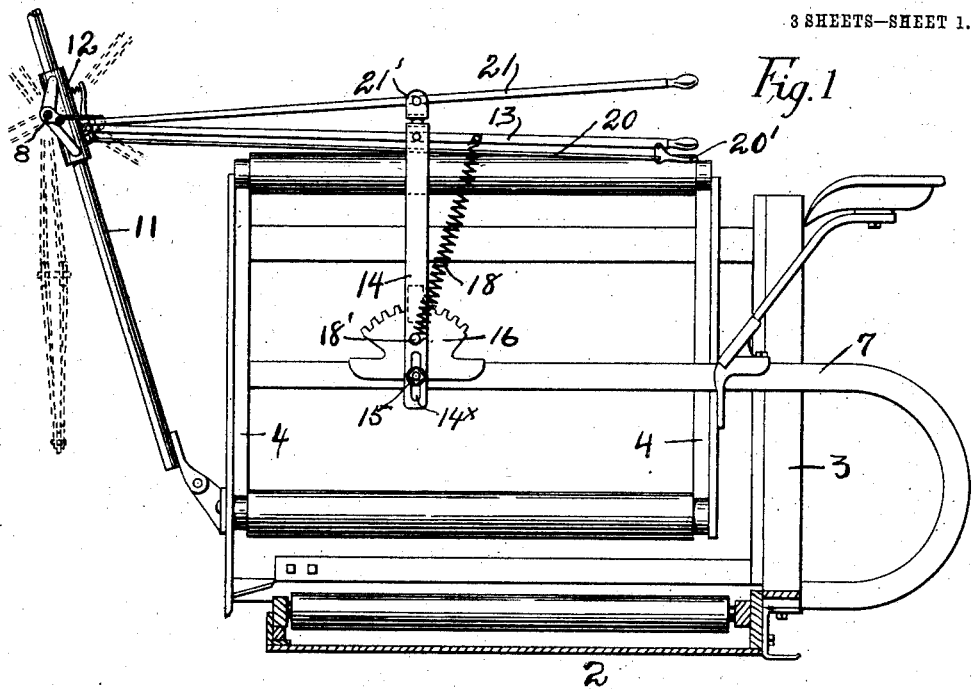
Figure 2:
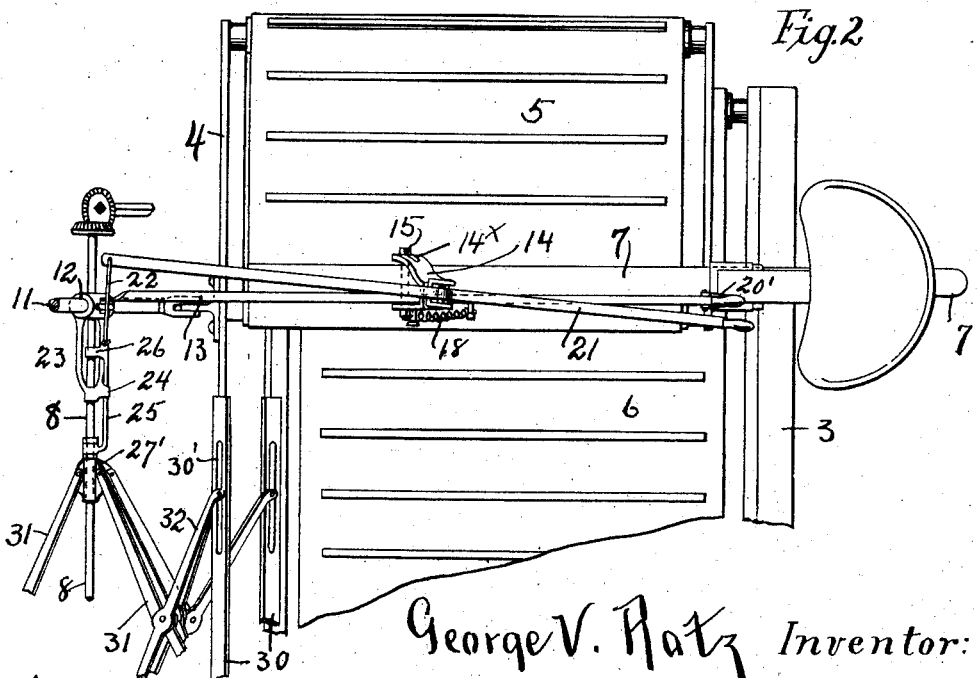

An embodiment of my invention is found in the accompanying drawings, wherein,

Figure 1 is a side view of so much of a harvester as is necessary to illustrate my invention, the lower grain platform being in section. Fig. 2 is a plan view of Fig. 1. Fig. 3 is a perspective of the reel detached from its supporting bar and expanded. Fig. 4 is a perspective view of the reel closed. Fig. 5 is a cross section on line x—x Fig. 3. Fig. 6 is a detail perspective of the sleeve and its wings. Fig. 7 is a perspective of the reel actuating mechanism. Fig. 8 is a face view of the sector and part of the reel elevating lever. Fig. 9 is a side view of the same. Fig. 10 is an edge view of one of the reel arms, the inner reel arm being shown in section.

Like numerals in the several views designate like parts.

2 designates the stubbleward end of the usual grain platform; 3 the carrier frame for the lower conveyer belt; 4 the frame for the upper carrier belt. The upper carrier is designated by 5 and the lower carrier by 6.

7 designates the seat supporting bar. The pole and its tilting lever are not shown as they form no part of my invention, and they would tend to obscure the construction. None of these elements before described form part of my invention, and they are only shown for the sake of clearness.

The usual reel-supporting standard 11 is pivoted at its lower end to the frame of the harvester and has a movement forward or backward in the plane of the axis of the machine. Sliding on the standard 11 is the sleeve 12 which carries the reel shaft 8 in a direction parallel to the front of the grain platform 2.

The sleeve 12 surrounds and has sliding engagement with the standard 11 and is raised or lowered by a lever 13 pivoted in the upper end of a bifurcated rocking standard 14 whose lower end has a shiftable pivotal engagement with a pivot-bolt 15 passing through the seat supporting bar 7, and a sector rack 16.

The legs 14' 14'' of the standard 14 are connected at the upper ends by a short cross bar 14''' and extend downward on both sides of the seat bar 7 and the sector 16. Attached to the standard 14 is a detent 17 adapted to engage with the teeth of the sector 16 when the standard is in its lowermost position. This I preferably form of a plate 17' attached at its upper end to the leg 14' and then angled out to a plane just beyond the plane of the sector. It then extends downward so as to bear against the face of the sector, the sector being thus held between the leg 14' and the inner face of the plate 17'. The detent tooth 17 is struck out from this plate as shown clearly in Figs. 8 and 9. This construction enhances the rigidity of the standard 14 against lateral movement of the lever 21.

At their lower ends the legs of the standard are slotted as at $14^\times$ for the passage of the pivot bolt 15. By lifting up on the standard the detent tooth escapes the teeth of the sector rack and the standard may then be rotated on its pivot 15. This, through the lever 13, which acts as a link, will move the bar 11 forward or backward.

The lever 13 is pivoted between the legs of the standard and at its end is pivoted to one of a pair of lugs 12' on sleeve 12. By actuating the lever 13 the sleeve 12 may be shifted up or down to various points on the supporting bar 11. The sleeve is held securely set by a latch 19 shown in detail in Fig. 7. This latch is pivoted between the lugs 12'. At one end it has an inwardly turned point which projects through an opening in the sleeve 12 and into any one of a series of holes 11' in the bar 11.

The upper end of the latch is pressed outward by a spring 19'. The lower end of the latch is connected by a rod 20 to a handpiece 20' whereby the latch may be withdrawn from engagement with the supporting rod 11 and the sleeve shifted.

A spring 18 is attached to hand lever 13 and to a stud 18' on the standard 14. This acts as a counterbalance when the reel is being moved up or down.

Swiveled to the bar 14''' on the upper end of the standard 14 is a rotatable head 21' in which a lever 21 is pivoted for movement in a vertical plane. It will be seen therefore that the swiveled head forms a universal joint, permitting the movement of the lever 21 in any direction. At its forward end, lever 21 is connected by a link 22 to the arms of the reel, as will be later described.

In order to provide a bearing for the reel shaft 8, the sleeve 12 is provided with the projecting yoke 23, whose forward end carries the shaft bearing 23'. Projecting out from the yoke end 23' is a lug 24 pierced for the passage of and forming a guide for an extension 25 of a reel hub 27. The rear end of the link has a guide 26 which surrounds and slides on the shaft 8. The hub 27 surrounds the shaft as does the guide or rear hub 26. The detailed construction of the reel is shown in Figs. 3 to 6.

The hub 25 slides on the shaft 8 being provided with a spline 27'' engaging with a groove 8', while at the forward end of the shaft is a corresponding fixed hub 28 which also of course rotates with the shaft. Each of these hubs is formed of a central sleeve having radially projecting wings 27' 28'. These wings on both hubs extend inward or toward each other, as well as radially.

30 designates the reel slats or beaters. There are as many of these as may be desired and they extend parallel to the shaft 8. Each slat is connected to a wing on the fixed hub 28 and to a wing on the sliding hub 27 and diagonal arms 31 32 crossing each other at their middles and there pivoted. These arms are precisely the same in construction. The arms 31 are pivoted to the wings of the sliding hub and extend diagonally forward and outward to the slats to which they are pivoted. The arms 32 are pivoted at the inner ends to the wings of the fixed hub 28 and extend rearwardly and outwardly to the slats to which they are pivotally connected by pins 32' which slide in slots 30' as the reel is opened or closed. Each of the arms 31 32 is composed of a pair of oppositely placed similar members or side pieces riveted together at their ends and separated at their centers by a spreader as shown at Fig. 10. At the centers each of the members of the pair are enlarged to form a central circular bearing plate 33.

As will be seen from Fig. 3 one arm composed of the two members as above described is located within the side pieces of the other arm so that the central plates 33 are in register with each other. A tubular spreader 34 (see Fig. 10) holds the middle portion of both arms expanded and a pivot bolt 35 passes through the center of the two arms and through the tubular spreader. It will thus be seen that one of each of the pairs of arms is pivoted within the other pair of arms and that the pairs may therefore fold on each other, as shown in Fig. 4, when the reel is in its closed position.

By reason of the spreading of the arms at the center and the riveting of the ends of the arms and of the centers each member of the cross arms is bent out of plane and the arms are thus braced. Not only is each individual arm thus trussed or braced by the spreading of the center but each pair presses against the other pair. This peculiar construction is a particular feature of my invention inasmuch as it prevents any twisting or bending to one side of the complete set of arms, a fault common to expansible reels. The wide circular bearings at the meeting point of the crossed arms is of advantage in giving rigidity to the construction and a thoroughly firm and solid bearing between the two arms.

It will be seen from the drawings that the two pieces of each arm are so riveted together that each arm at each end is adapted to receive one of the hub wings or a slat between the ends of the two portions of the arm, the pivotal connection between the arms and the slat, or between the arm and the hub wing, passing through both elements of the arm and through the wing and the slat.

The operation of my invention is as follows: The reel sleeve support 11 may be shifted to any angle to the main frame desired by lifting upon lever 13 which raises the detent tooth 17 out of the rack 16, the standard 14 then turning upon its pivot. The lever 21 may also be used for the purpose of lifting the standard 14 and thereby the detent from engagement with the sector rack. Thus either of the levers 13 or 21 may be used to adjust the angle of the supporting bar 11. When the bar 11 has been moved to the position desired, the lever 13 is forced downward, allowing the detent to enter again between the teeth of the rack, thus holding the supporting bar 11 rigidly in place wherever set. The sleeve 12 may be moved up and down upon the bar 11 by lifting the latch 19 through the rod 20 and its handle lever 20' and operating the lever 13 upon its fulcrum. When the latch is released the spring 19' forces it into engagement with one of the recesses 11' on the bar 11 thus holding the sleeve in the position set.

It will be seen from detailed Fig. 7 that the lever 21 is connected at its inner end by a link 22 to the extension 25 of the movable reel hub. By moving the lever 21 in a horizontal plane, the extension 25 and the movable hub 27 may be shifted forward or backward upon the reel shaft 8, thus opening and closing the reel. In order that the reel may be held at any desired diameter of extension the link 22 is notched as at 22' and these notches engage with a loop or eye 22'' projecting outward from the sleeve 12, the link 22 passing through this eye or loop. A slight lift of the lever will be sufficient to disengage the notch 22' from the edge of the loop and allow the lever to be rotated. It is, of course, necessary that the lever 21 should be pivoted for movement in a vertical plane so that it may be lifted or depressed to correspond with the elevation or depression of the sleeve 12.

The advantages of my invention are many: The combination of the three levers, namely, the standard 14 and the hand levers 13 and 21, permit of an adjustment of the reel either forward or back, up or down, or expanded and contracted to any degree required by the circumstances of cutting, the condition or length of the grain, whether standing or beaten down, long or short. These three levers, or more properly the two levers and the standard 14, are so arranged contiguous to each other as to form practically one operating part convenient to the hand of the operator and whereby he can control the adjustment of the apparatus immediately and with great ease. This is a necessity where it is often desirable to work beneath overhanging boughs or in other situations where the reel requires to be dropped quickly and where under the same circumstances, the grain being short, the diameter of the reel must be adjusted to suit.

Another important advantage of my combination of a folding reel with the reel shaft-adjusting mechanism, is that in addition to the means of adjustment of the reel shaft 8 to a number of positions by lever 13, the folding reel which I have devised by its capability of adjustment alone gives ample range to properly reel either long or short grain.

Ordinarily the reel shaft 8 being once set at a desired elevation by means of the lever 13, the finer adjustments by lever 21 alone need be used for all conditions of grain. It is important to note in this connection the balanced movement of the beaters whereby when the lower beaters are raised the opposite beaters act to counterbalance the weight of the lower beaters. This counterbalancing action is particularly advantageous as by it only a minimum of force is required to manipulate the lever 21. Again, the use of an expansible and contractible reel has this advantage over the ordinary reel that when there is a necessity of lifting the lower beaters as for long grain the upper opposite beaters are correspondingly dropped. Thus the reel taken as a whole always works relatively close to the ground. When working in short grain the reel is expanded and the lower beaters are brought near the ground, the upper beaters are at their highest point which, however, is relatively low considering the low working positions of reel shaft 8 under all conditions.

With the ordinary non-expansible reel it is continually necessary to shift the reel upward and downward and this requires lifting the entire weight of the reel. This is entirely obviated by my construction. It may also be pointed out that when the shaft 8 is used in its lower planes, the reel may be relatively contracted and the reel body thus is brought nearer to the grain platform and is thus not only very compact but its lowered position brings it out of the way.

Another main point of advantage consists in the parallelism of the slats 30 at all times. No matter what degree of expansion is used the beaters are parallel with each other and with the shaft 8. It is through this parallelism that I am able to operate the reel under all circumstances of expansion and contraction and am not confined to using it merely in its extreme open position. Other points of advantage lie in the peculiar construction of the reel cross arms before referred to whereby the utmost strength and solidity consistent with lightness are secured.

It will be noticed that the radial wings 27' 28' are relatively wide and extend outward from the shaft in the direction of the arms attached thereto, and that the arm is pivoted at the base of said extension. This peculiar detail gives additional rigidity to the reel as the wings so extended between the two sections of the arms in the direction which the arm will take when the reel is expanded acts to support the arm better and to hold it more firmly against lateral strain.

The outer ends of the arms 31, 32 are slightly bent outward at their engagement with the grain slats; this is a minor yet advantageous detail as this reduces friction between the arm and the slat to a minimum when folding or unfolding.

While I have shown my reel as connected with an adjusting mechanism of the peculiar form shown in Figs. 1 and 7, it is to be understood that the reel is equally well adapted to be used in connection with other forms of reel supports such as are in common use and that I do not wish to be limited to its use in connection with the adjusting mechanism which I have specially devised for it.

Having described my invention what I claim is:

1. In a harvester, a reel standard pivoted at its lower end and movable backward or forward on said pivot, a reel shaft support shiftable up and down on the reel standard, a rotatable reel shaft carried on said shaft support, an expansible reel carried thereon, a shaft adjusting lever connected to the reel shaft support and pivoted for movement in a vertical plane, a support for the fulcrum of said lever independent of the reel standard and shiftable forward and back, and a reel expanding lever pivoted to the support of the shaft-adjusting lever for movement in planes at right angles to the movement of the shaft-adjusting lever.

2. In a harvester, a reel standard movable backward or forward, a reel shaft support shiftable up and down on the reel standard, a rotatable reel shaft carried on said shaft support, an expansible reel carried thereon, a shaft adjusting lever connected to the reel shaft support and pivoted for movement in a vertical plane, a support for the fulcrum of said lever shiftable forward and back, and a reel expanding lever having a universal joint connection with the support of the shaft-adjusting lever, whereby it may have movement in a vertical or horizontal plane.

3. In a harvester, a reel standard pivoted at its lower end, a reel shaft support surrounding said standard and shiftable up and down thereon, a rotatable reel shaft passing through bearings on said shaft support, an expansible reel carried thereon, a shaft adjusting lever pivoted at one end to the reel shaft support for movement in a vertical plane, a support for the fulcrum of said lever shiftable forward and back, means for locking the lever support to any position to which it may be adjusted, means for locking the shaft support to any position on the reel standard to which it may be adjusted, and a reel expanding lever having a universal joint connection with the support of the shaft adjusting lever whereby it may have movement in a vertical or horizontal plane.

4. In a harvester, a reel standard pivoted at its lower end, a reel shaft support surrounding said standard, a rotatable reel shaft passing through bearings on said shaft support, an expansible reel carried thereon, a sector rack rigidly mounted on the frame of the machine, a standard having a vertically shiftable pivotal engagement with said sector, a fixed detent tooth on the standard adapted to engage with the teeth of the sector rack when the standard is in its lowermost position, and a reel adjusting lever pivoted at the upper end of the standard and connected at one end to the reel shaft support.

5. In a harvester, a reel standard pivoted at its lower end, a reel shaft support surrounding said standard, a rotatable reel shaft passing through bearings on said shaft support, an expansible reel carried thereon, a sector rack rigidly mounted on the frame of the machine, a standard having a vertically shiftable pivotal engagement with the said sector, a fixed detent tooth on the standard adapted to engage with the tooth of the sector rack when the standard is in its lowermost position, a reel adjusting lever pivoted at the upper end of the standard and pivoted at one end to the reel shaft support, and hand operated means attached to the said lever whereby the reel support may be held adjusted in any desired position upon the reel standard.

6. In a harvester, a reel standard pivoted at its lower end, a reel shaft support surrounding said standard, a rotatable reel shaft passing through bearings on said shaft support, an expansible reel carried thereon, a sector rack rigidly mounted on the frame of the machine, a standard having a vertically shiftable pivotal engagement with the said sector, a fixed detent tooth on the standard adapted to engage with the tooth of the sector rack when the standard is in its lowermost position, a reel adjusting lever pivoted at the upper end of the standard and pivoted at one end to the reel shaft support, a toothed latch on the reel shaft support engaging with perforations on the reel supporting standard, said latch being provided with a spring whereby it is normally forced into engagement with the said reel supporting standard, a hand lever mounted on the shaft adjusting lever, and a connection from said hand lever to said latch.

7. In a harvester, a reel standard pivoted at its lower end, a reel shaft support surrounding said standard, a rotatable reel shaft passing through bearings on said shaft support, an expansible reel carried thereon, a sector rack rigidly mounted on the frame of the machine, a standard having a vertically shiftable pivotal engagement with the said sector, a fixed detent tooth on the standard adapted to engage with the tooth of the sector rack when the standard is in its lowermost position, a reel adjusting lever pivoted at the upper end of the standard and pivoted at one end to the reel shaft support, hand operated means attached to the said lever whereby the reel support may be held adjusted in any desired position upon the reel standard, a reel expanding lever pivoted by a universal joint to the said standard connected at one end to the reel, said lever having movement either in a vertical or horizontal plane, and means for holding the reel expanded or contracted to any degree to which it is adjusted by said lever.

8. In a harvester, a reel standard pivoted at its lower end, a reel shaft support surrounding said standard, a rotatable reel shaft passing through bearings on said shaft support, an expansible reel carried thereon, a sector rack rigidly mounted on the frame of the machine, a standard having a vertically shiftable pivotal engagement with the said sector, a fixed detent tooth on the standard adapted to engage with the tooth of the sector rack when the standard is in its lowermost position, a reel adjusting lever pivoted at the upper end of the standard and pivoted at one end to the reel shaft support, hand operated means attached to the said lever whereby the reel support may be held adjusted in any desired position upon the reel standard, a reel expanding lever pivoted by a universal joint to the said standard connected at one end to the reel, said lever having movement either in a vertical or horizontal plane, a sliding hub on the reel shaft forming part of the expansible reel, a link connecting the reel adjusting lever to the said sliding hub, said link having notches along its length, and a guide through which the said link passes, said guide having an edge adapted to engage with any one of the said notches to hold the hub and the connected reel set in any desired position of expansion.

9. In a harvester, a reel standard pivoted at its lower end, a reel shaft support surrounding said standard, a rotatable reel shaft passing through bearings on said shaft support, a sector rack rigidly mounted on the frame of the machine, a standard having a vertically shiftable pivotal engagement with the said sector, a fixed detent tooth on the standard adapted to engage with the tooth of the sector rack when the standard is in its lowermost position, a reel adjusting lever pivoted at the upper end of the standard and pivoted at one end to the reel shaft support, hand operated means attached to the said lever whereby the reel support may be held adjusted in any desired position upon the reel standard, a reel expanding lever pivoted by a universal joint to the said standard, a sliding hub mounted on the reel shaft and connected to the reel expanding lever and having means whereby it may be rotated with the reel shaft, a fixed hub on said reel shaft, a series of grain slats, and crossed arms pivoted at their meeting points having pivotal engagement on their inner ends with the fixed and sliding hubs respectively and pivoted at their outer ends to the said grain slats.

10. In a harvester, a reel standard pivoted at its lower end, a reel shaft support surrounding said standard, a rotatable reel shaft passing through bearings on said shaft support, a sector rack rigidly mounted on the frame of the machine, a standard having a vertically shiftable pivotal engagement with the said sector, a fixed detent tooth on the standard adapted to engage with the tooth of the sector rack when the standard is in its lowermost position, a reel adjusting lever pivoted at the upper end of the standard and pivoted at one end to the reel shaft support, hand operated means attached to the said lever whereby the reel support may be held adjusted in any desired position upon the reel standard, a reel expanding lever pivoted by a universal joint to the said standard, a sliding hub mounted on the reel shaft and connected to the reel expanding lever, and having means whereby it may be rotated with the reel shaft, a fixed hub on said reel shaft, one series of arms extending from the sliding hub diagonally outward to the grain slats to which said arms are pivoted, and another series of arms pivoted to the fixed hub and extending diagonally outward to the said grain slats, said second series of arms having pivots at their ends having sliding engagement with the said grain slats.

11. In a folding harvester reel, a rotatable reel shaft, a fixed hub on said shaft, a hub sliding on said shaft but rotatable therewith, said hubs being provided with outwardly projecting radial wings, a series of grain slats slotted at one end, a series of arms each arm having a passage through its center and being cleft at its ends for engagement with the hub wings and with the slats, pivots attaching said arms to the wings and slats respectively, a series of arms passing through the openings in and there crossing said first named arms and pivoted at their centers, said arms being cleft at their ends for engagement with the fixed hub wings and with the grain slats, pivots holding the ends of said last named arms to the fixed hub wings, the other ends of said arms having pivotal engagement with the slotted portion of said grain slats.

12. In an expansible reel, a central shaft, a series of grain slats, and a series of pairs of crossed arms pivoted to the slats and to the central shaft, each of said arms being composed of two duplicate sections riveted to each other at their ends, and the two sections being sprung outwardly away from each other at the middle, a spreader interposed between said separated portions, and a rivet for drawing the middles of the sections toward each other.

13. In an expansible reel, a central shaft, a series of radial arms pivoted at one end to the shaft and extending rearwardly and outwardly, a series of radial arms having sliding engagement at the inner ends with said shaft, and extending forwardly and outwardly, and a series of grain slats having pivotal engagement with the outer ends of said arms, each of said arms consisting of oppositely placed, duplicate sections formed with an expanded bearing surface at the center, riveted together at the extremities, the arms of one series of arms extending through the arms of the other series, the two arms bearing against each other at the central expanded bearing portion, a spreader interposed between the two sections of the inside arm, and a pivot bolt passing through the four sections of the two arms and holding them in engagement with each other.

14. In an expansible reel, a central shaft, a series of grain slats, and a series of radial arms crossing each other at the middles and pivoted to the said slats and to the shaft, each pair of crossed arms being widened at the middle to form mutual bearing surfaces, and pivoted together through the center of said widened portion.

15. In an expansible reel, a central shaft, reel hubs, radial reel arms pivotally connected to the central shafts, and slats pivotally connected to the other ends of said arms, the outer ends of the arms being bent outward at such an angle to the main part of the arms.

16. In an expansible reel, a central shaft, a fixed reel hub thereon, a sliding reel hub thereon, radial reel arms rearwardly inclined and pivoted at their inner ends to the fixed hub, radial reel arms forwardly inclined crossing the first named reel arms and pivoted to the sliding hub, both series of said arms having bifurcated extremities, a series of grain slats pivoted to the forwardly and outwardly extended series of arms and located along their length, the bifurcated ends of the rearwardly inclined series of arms engaging the said slats and being provided with pivot pins passing through the longitudinal slots of said slats.

In testimony whereof, I have signed my name to this specification in the presence of two subscribing witnesses, this seventh day of May 1907.

GEORGE V. RATZ.

Witnesses:
GEORGE M. BOSS,
ELLSWORTH V. BARTLETT.